United States Patent
Webber et al.

(10) Patent No.: US 8,762,230 B2
(45) Date of Patent: Jun. 24, 2014

(54) SYSTEM AND METHOD FOR VIRTUAL PIGGY BANK WISH-LIST

(75) Inventors: Jo Webber, Philadelphia, PA (US); Pradeep Ittycheria, Philadelphia, PA (US)

(73) Assignee: Virtual Piggy, Inc., Hermosa Beach, CA (US)

(*) Notice: Subject to any disclaimer, the term of this patent is extended or adjusted under 35 U.S.C. 154(b) by 0 days.

(21) Appl. No.: 13/431,256

(22) Filed: Mar. 27, 2012

(65) Prior Publication Data

US 2013/0110670 A1    May 2, 2013

Related U.S. Application Data

(60) Provisional application No. 61/554,578, filed on Nov. 2, 2011.

(51) Int. Cl.
  G06Q 30/00        (2012.01)
  G06Q 30/06        (2012.01)

(52) U.S. Cl.
  CPC .................................. *G06Q 30/0633* (2013.01)
  USPC ...................................................... 705/26.8

(58) Field of Classification Search
  USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
  See application file for complete search history.

(56) References Cited

U.S. PATENT DOCUMENTS

| | | | |
|---|---|---|---|
| 5,262,943 A | 11/1993 | Thibado et al. | |
| 6,173,269 B1 | 1/2001 | Soloki et al. | |
| 6,397,256 B1 | 5/2002 | Chan et al. | |
| 6,785,824 B1 | 8/2004 | Grassle | |
| 7,171,382 B2 * | 1/2007 | Beacham | 705/35 |
| 7,171,392 B2 | 1/2007 | Brookner et al. | |
| 7,302,272 B2 | 11/2007 | Ackley | |
| 7,562,387 B2 | 7/2009 | Nguyen et al. | |

(Continued)

FOREIGN PATENT DOCUMENTS

| | | |
|---|---|---|
| JP | 2006-526327 A | 11/2006 |
| JP | 2007-510979 A | 4/2007 |

(Continued)

OTHER PUBLICATIONS

Notification of Transmittal of Search Report and Written Opinion of the International Searching Authority from the PCT dated Oct. 29, 2012 in a counterpart PCT application.

(Continued)

*Primary Examiner* — Naeem Haq
(74) *Attorney, Agent, or Firm* — Morgan, Lewis & Bockius LLP

(57) ABSTRACT

A non-transitory computer-readable storage medium, storing one or more programs configured for execution, the one or more programs for monitoring, transmitting, and recording usage of a computer or mobile device connected to a network, the one or more programs including instructions for establishing a first account, the settings of the first account being stored in a database; establishing a second account, the settings of the second account being stored in the database, wherein the second account includes a wish-list; linking the first and second accounts such that control settings of the second account are determined through the first account; and making a purchase from the wish-list of the second account consistent with the control settings of the second account.

21 Claims, 19 Drawing Sheets

(56) References Cited

U.S. PATENT DOCUMENTS

| | | | |
|---|---|---|---|
| 7,640,336 B1 | 12/2009 | Lu et al. | |
| 7,657,457 B2* | 2/2010 | Razumov | 705/27.2 |
| 7,734,779 B1 | 6/2010 | Piccionelli | |
| 7,828,652 B2 | 11/2010 | Nguyen et al. | |
| 7,945,512 B2 | 5/2011 | Scipioni et al. | |
| 8,001,045 B1 | 8/2011 | McClinton | |
| 8,116,726 B2 | 2/2012 | Richardson et al. | |
| 8,127,982 B1 | 3/2012 | Casey et al. | |
| 8,132,212 B2* | 3/2012 | Huegel | 725/61 |
| 8,249,986 B2 | 8/2012 | Scipioni et al. | |
| 8,312,484 B1 | 11/2012 | McCarty et al. | |
| 2002/0049806 A1 | 4/2002 | Gatz et al. | |
| 2002/0055911 A1 | 5/2002 | Guerreri | |
| 2002/0074397 A1 | 6/2002 | Matthews | |
| 2002/0120866 A1 | 8/2002 | Mitchell et al. | |
| 2003/0088490 A1* | 5/2003 | Beacham | 705/36 |
| 2003/0154138 A1 | 8/2003 | Phillips et al. | |
| 2003/0204445 A1 | 10/2003 | Vishik et al. | |
| 2003/0233296 A1 | 12/2003 | Wagner | |
| 2004/0153421 A1 | 8/2004 | Robinson | |
| 2004/0215534 A1 | 10/2004 | Gautier et al. | |
| 2005/0038744 A1 | 2/2005 | Viijoen | |
| 2005/0039053 A1 | 2/2005 | Walia | |
| 2005/0044181 A1 | 2/2005 | Lee | |
| 2005/0076367 A1 | 4/2005 | Johnson et al. | |
| 2005/0102407 A1 | 5/2005 | Clapper | |
| 2006/0069627 A1* | 3/2006 | Petersen et al. | 705/27 |
| 2006/0161593 A1 | 7/2006 | Mori et al. | |
| 2006/0161669 A1 | 7/2006 | Mathew et al. | |
| 2006/0173792 A1 | 8/2006 | Glass | |
| 2006/0259778 A1 | 11/2006 | Gudorf et al. | |
| 2007/0118475 A1 | 5/2007 | Picciallo et al. | |
| 2007/0203954 A1 | 8/2007 | Vargas et al. | |
| 2007/0220494 A1 | 9/2007 | Spooner | |
| 2007/0245152 A1 | 10/2007 | Pizano et al. | |
| 2007/0250392 A1 | 10/2007 | Paulsen et al. | |
| 2007/0260603 A1 | 11/2007 | Tuscano et al. | |
| 2008/0004984 A1* | 1/2008 | Sendo et al. | 705/26 |
| 2008/0033740 A1 | 2/2008 | Cahn et al. | |
| 2008/0148362 A1 | 6/2008 | Gilder et al. | |
| 2008/0168548 A1 | 7/2008 | O'Brien | |
| 2008/0228615 A1 | 9/2008 | Scipioni et al. | |
| 2008/0228637 A1 | 9/2008 | Scipioni et al. | |
| 2008/0228638 A1 | 9/2008 | Scipioni et al. | |
| 2008/0307339 A1* | 12/2008 | Boro et al. | 715/764 |
| 2009/0043747 A1 | 2/2009 | Smith et al. | |
| 2009/0064302 A1 | 3/2009 | Colella | |
| 2009/0112763 A1 | 4/2009 | Scipioni et al. | |
| 2009/0235086 A1 | 9/2009 | Lai et al. | |
| 2009/0281937 A1 | 11/2009 | Gupta et al. | |
| 2009/0292595 A1* | 11/2009 | Tonnison et al. | 705/11 |
| 2009/0299841 A1 | 12/2009 | Bishop et al. | |
| 2010/0042912 A1 | 2/2010 | Whitaker | |
| 2010/0114733 A1 | 5/2010 | Collas et al. | |
| 2010/0223184 A1 | 9/2010 | Perlman | |
| 2011/0010293 A1 | 1/2011 | Giordano et al. | |
| 2011/0047629 A1 | 2/2011 | Mitchell et al. | |
| 2011/0184855 A1 | 7/2011 | Webber et al. | |
| 2011/0185399 A1 | 7/2011 | Webber et al. | |
| 2011/0185400 A1 | 7/2011 | Webber et al. | |
| 2011/0237222 A1 | 9/2011 | Niejadlik | |
| 2012/0005582 A1 | 1/2012 | Webber et al. | |
| 2012/0022969 A1 | 1/2012 | Collas et al. | |
| 2012/0123865 A1* | 5/2012 | Salzano | 705/14.55 |
| 2012/0171990 A1 | 7/2012 | Williams et al. | |
| 2012/0209768 A1 | 8/2012 | Nuzzi | |
| 2012/0209772 A1 | 8/2012 | Nuzzi et al. | |
| 2012/0259768 A1 | 10/2012 | Mukherjee | |
| 2012/0278202 A1 | 11/2012 | Webber et al. | |
| 2012/0278233 A1 | 11/2012 | Webber et al. | |
| 2012/0303523 A1 | 11/2012 | Webber et al. | |
| 2013/0018792 A1 | 1/2013 | Casey et al. | |
| 2013/0080323 A1 | 3/2013 | Scipioni | |
| 2013/0110670 A1 | 5/2013 | Webber et al. | |
| 2013/0110716 A1 | 5/2013 | Rekhi et al. | |

FOREIGN PATENT DOCUMENTS

| | | |
|---|---|---|
| KR | 10-2002-0021515 A | 3/2002 |
| KR | 10-0374296 B1 | 2/2003 |
| KR | 10-2003-0066494 | 8/2003 |
| KR | 10-2003-0066494 A | 8/2003 |
| KR | 10-2006-0103363 A | 9/2006 |
| KR | 10-2008-0009175 A | 1/2008 |
| WO | 00/36570 A1 | 6/2000 |
| WO | 2004/089006 A2 | 10/2004 |
| WO | 2008/101312 A1 | 8/2008 |
| WO | 2011/028985 A2 | 3/2011 |
| WO | 2011/028989 A2 | 3/2011 |
| WO | 2011/028991 A2 | 3/2011 |
| WO | 2011/028992 A2 | 3/2011 |

OTHER PUBLICATIONS

International Search Report (PCT/US2012/033022), Oct. 4, 2012.
International Search Report (PCT/US2012/033002), Oct. 29, 2012.
International Search Report (PCT/US2012/032998), Oct. 31, 2012.
International Search Report (PCT/US2010/047794), May 24, 2011.
International Search Report (PCT/US2010/047796), May 2, 2011.
IGN Staff (E3 2002: All About Xbox Live, Full Blowout on Microsoft's Online Service Including Price, Launch Titles, and More, May 20, 2002).
International Search Report (PCT/US2010/047785), Apr. 29, 2011.
Written Opinion (PCT/US2010/047785), Apr. 29, 2011.
International Preliminary Report on Patentability (PCT/US2010/047785), Mar. 6, 2012.
International Search Report (PCT/US2010/047790), Jun. 8, 2011.
Written Opinion (PCT/US2010/047790), Jun. 8, 2011.
International Preliminary Report on Patentability (PCT/US2010/047790), Mar. 6, 2012.
Written Opinion (PCT/US2010/047794), May 24, 2011.
International Preliminary Report on Patentability (PCT/US2010/047794), Mar. 6, 2012.
Written Opinion (PCT/US2010/047796), May 2, 2011.
International Preliminary Report on Patentability (PCT/US2010/047796), Mar. 6, 2012.
U.S. Office Action for U.S. Appl. No. 12/991,053, dated Sep. 19, 2013.
Content Watch Internet Protection "Net Nanny Parental Controls User Guide," 2007, ContentWatch Inc., pp. 1-83—Retrieved from http://www.netnanny.com/assets/documentation/nn/netnanny_56.pdf.
USPTO—Office Action for U.S. Appl. No. 12/991,057—Issued—Oct. 31, 2013.
CIPO: Examination Report for Canadian Patent Application No. 2,772,399—Issued on Oct. 23, 2013.
USPTO—Notice of Allowance for U.S. Appl. No. 12/991,063—Issued on Oct. 21, 2013.
U.S. Office Action for U.S. Appl. No. 13/567,610, dated Oct. 11, 2013.
Office Action dated Jan. 21, 2014, issued by the U.S. Patent & Trademark Office in U.S. Appl. No. 13/431,044.
Notice of Allowance dated Feb. 25, 2014, issued by the U.S. Patent & Trademark Office in U.S. Appl. No. 13/247,572.

* cited by examiner

TCP/IP Layering Model

| Child Profile Name | Date Created (EST) | Last Used (EST) | Status | Dashboard | Change Password | Manage Authorized Users | |
|---|---|---|---|---|---|---|---|
| Add New | | | | | | | |
| Meghna | June 30 2011 10:49 PM | June 30 2011 10:50 PM | ON | Dashboard | Change | Add | Change |
| James | Dec 29 2010 9:15 PM | June 30 2011 08:02 PM | ON | Dashboard | Change | Add | Change |
| Albus | Dec 29 2010 9:15 PM | June 29 2011 10:15 PM | ON | Dashboard | Change | Add | Change |
| Lily | Dec 29 2010 9:15 PM | June 29 2011 10:15 PM | ON | Dashboard | Change | Add | Change |

1510   1520

Authorized Users for <child profile name>

| Name | Location | Virtual Piggy ID | Remove |
|---|---|---|---|
| Pradeep Ittycheria | Cypress, TX | pittycheria | ☐ |
| Jo Webber | Boston, MA | jwebber | ☐ |
| Yann Perrin | San Jose, CA | ypblackbelt | ☐ |
| Laura Holder | San Diego, CA | lostsoul | ☐ |

1710

Done   Cancel

SYSTEM AND METHOD FOR VIRTUAL PIGGY BANK WISH-LIST

This application claims the priority and benefit of U.S. Provisional Patent Application No. 61/554,578, filed on Nov. 2, 2011, which is incorporated herein by reference.

CROSS-REFERENCE TO RELATED APPLICATIONS

This application is related to U.S. patent application Ser. No. 13/431,044, filed Mar. 27, 2011, which claims the priority and benefit of U.S. Provisional Patent Application No. 61/479,243 filed on Apr. 26, 2011, and is incorporated herein by reference.

This application is related to U.S. patent application Ser. No. 13/431,023, filed Mar. 27, 2011, which claims the priority and benefit of U.S. Provisional Patent Application No. 61/479,241 filed on Apr. 26, 2011, and is incorporated herein by reference.

This application is related to U.S. patent application Ser. No. 12/991,063 filed Apr. 8, 2011, which claims the priority and benefit of U.S. Provisional Patent Application No. 61/272,235 filed on Sep. 3, 2009, and is incorporated herein by reference.

This application is related to U.S. patent application Ser. No. 12/991,053 filed Apr. 8, 2011, which claims the priority and benefit of U.S. Provisional Patent Application No. 61/272,233 filed on Sep. 3, 2009, and is incorporated herein by reference.

This application is related to U.S. patent application Ser. No. 12/991,057 filed Apr. 8, 2011, which claims the priority and benefit of U.S. Provisional Patent Application No. 61/272,234 filed on Sep. 3, 2009, and is incorporated herein by reference.

This application is related to U.S. patent application Ser. No. 12/991,059 filed Apr. 8, 2011, which claims the priority and benefit of U.S. Provisional Patent Application No. 61/272,232 filed on Sep. 3, 2009, and is incorporated herein by reference.

BACKGROUND OF THE INVENTION

1. Field of the Invention

The present invention relates an Internet payment system and method, and more particularly to an Internet payment system and method having a variety of customizable controls, which can be accessed and implemented during an actual purchasing transaction from a prospective Internet user's wish-list.

2. Discussion of the Related Art

Using the Internet has become extremely easy, and one aspect of this ease is that children of very young ages are able to gain access to Internet websites of all kinds and make purchases at a variety of websites. Juxtaposed with this ease is the Children's Online Privacy Protection Act (COPPA), which lays out specific guidelines for how website operators and online businesses must interact with children 13 and under. In general COPPA requires parental notification and consent prior to an online operator's collecting, using or disclosing a child's personal information. Compliance with COPPA can be daunting for an online business. While some online businesses are taking steps to comply with COPPA, many of the new media companies including Facebook are choosing to avoid COPPA compliance by restricting their sites to over 13's, and foregoing a significant business opportunity in interacting with the under 13 market segment. In the past, parents were often happy to give their children small amounts of money to buy comics and candy from a corner store, there is no equivalent mechanism currently for the internet. The generation of children growing up today has never known a world where the internet was not present and they expect to be able to play games, interact with friends and make purchases online. There is ever increasing pressure on the parents and guardians to provide more online access to their children, while at the same time a worrying lack of control in the online world.

Parental controls are known and generally fall into two categories: active control and passive control. Active controls (e.g., hardware and software firewalls; and hardware access controls and systems) prevent a child from accessing information over the Internet that a parent does not want them to retrieve and view. Passive controls (e.g., a software audit system) allow a parent to audit the information their children have been accessing and the activities their children have been performing while online. While these active and passive control systems help parents to control the information available to children via the Internet, there are no provisions to control the types of services that children may sign up for and/or purchase over the Internet.

Currently, parents may either provide their children with a credit card or purchase a pre-paid card so that their children may conduct a monetary transaction on the Internet. While this may work for a few instances, it is not a viable option with the rapid growth of websites, online games and online applications appealing to children and the ever increasing online footprint of children. The credit card is also particularly troubling since it provides no control or limitation on what or how much the child can acquire.

With the rapid proliferation of websites, online games, and online applications for children under 13, there is a need for a system that parents can setup and children can use to conduct online monetary transactions while limiting or obviating a child's need to provide their personal information. Thus, a system is needed that will enable a parent to quickly and easily manage a child's access and personal information provided to websites, or in the alternative provide parental consent to the collection and use of certain necessary information as well as to control how money is spent at the websites by a child.

SUMMARY OF THE INVENTION

Accordingly, the present invention is directed to a system and method for a virtual piggybank that substantially obviates one or more problems due to limitations and disadvantages of the related art.

In an embodiment of the present invention, a method and system of control preferences for a prospective Internet user by creating an online account funded through a direct deposit, the account includes specific control parameters; activating the online account by accessing a web based system designated by the online account; and controlling a user's use of the web based system through the online account. In addition, the system provides a web page and view for a registered user to use. The web page contains information on how much money has been pre-approved for spending, how much is available to spend, and contains a wish-list of desired items contributors may purchase through the system.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, in one aspect, a computer-implemented method of establishing an online account for a prospective user, the method comprising the steps of: establishing a first account, the settings of the first account being stored in a database; establishing a second account, the settings of the second account being stored in the database, wherein the second account includes a wish-list; and linking the first and second accounts such that control settings of the second account are determined through the first account.

In another aspect, the system for virtual piggybank includes providing control preferences for a prospective Internet user comprising: a server; and a database hosted on the server, the database storing information for a first account which is a custodian account, and a second account, which includes a user's wish-list; wherein control settings of the second account are established through the first account such that purchases made from the wish-list of the second account are consistent with the control settings.

In yet another aspect, the instructions for virtual piggybank includes a non-transitory computer-readable storage medium, storing one or more programs configured for execution, the one or more programs for monitoring, transmitting, and recording usage of a computer or mobile device connected to a network, the one or more programs comprising instructions to: establishing a first account, the settings of the first account being stored in a database; establishing a second account, the settings of the second account being stored in the database, wherein the second account includes a wish-list; linking the first and second accounts such that control settings of the second account are determined through the first account; and making a purchase from the wish-list of the second account consistent with the control settings of the second account.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 14 illustrates an exemplary of a contributor sign-up screen of the virtual piggybank according to an exemplary embodiment of the present invention.

FIG. 15 is an exemplary child profiles screen according to an exemplary embodiment of the present invention.

FIG. 17 is an exemplary view of an authorized contributors screen according to an exemplary embodiment of the present invention.

DETAILED DESCRIPTION OF THE EXEMPLARY EMBODIMENTS

Reference will now be made in detail to the embodiments of the present invention, examples of which are illustrated in the accompanying drawings.

In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented by any type of user (i.e., not limited to parent and child) and on any type of standalone system or client-server compatible system containing any type of client, network, server, and database elements.

Figure 1:
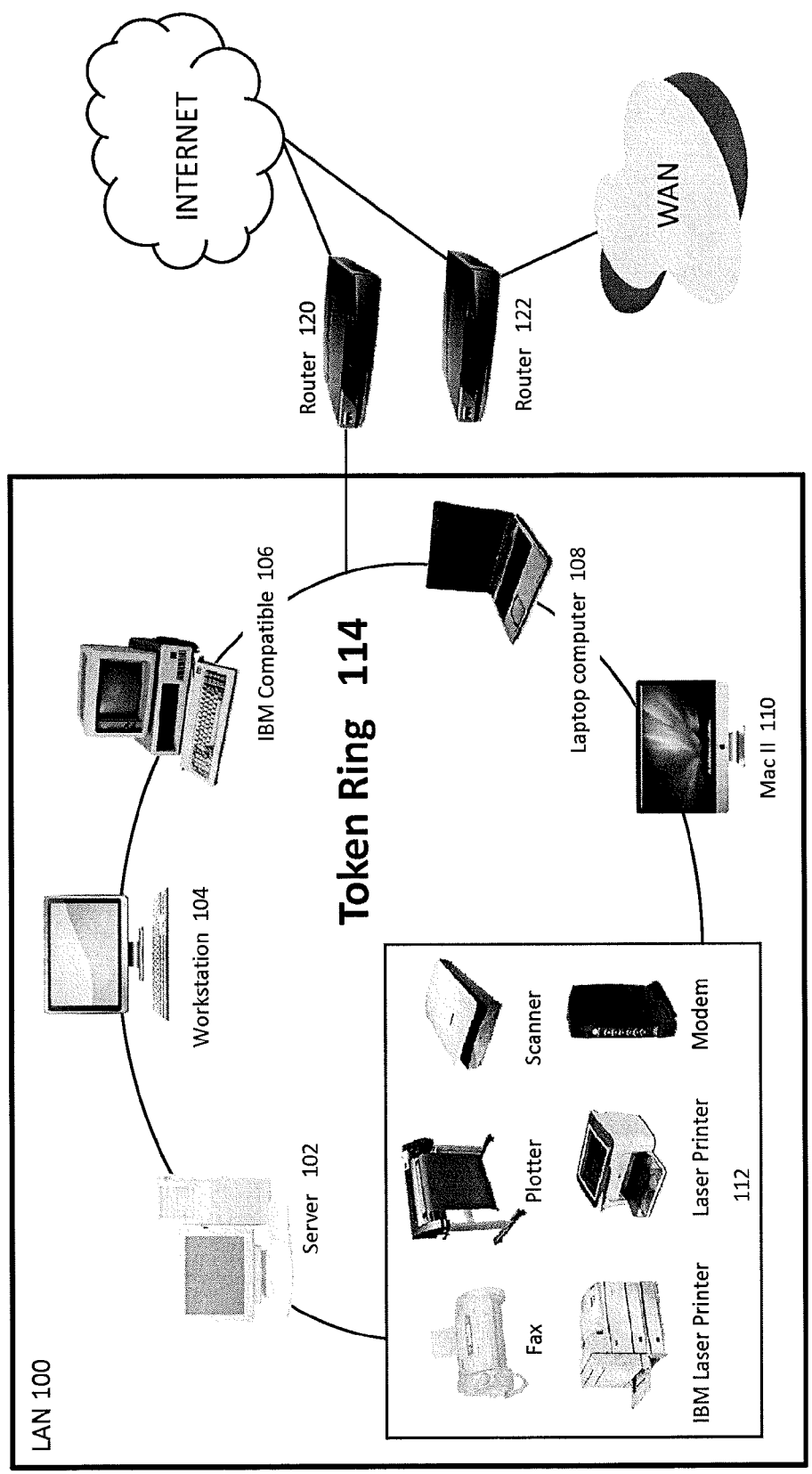
FIG. 1 illustrates an example of a local area network (LAN) 100 that is connected to the Internet and in which the inventive method may be utilized.

FIG. 1 illustrates an example of a local area network (LAN) 100 that is connected to the Internet and in which the inventive system and method may be utilized. LAN 100 comprises a server 102, four computer systems 104, 106, 108, 110, and peripherals, such as printers and other devices 112, that may be shared by components on LAN 100. Computer systems 104, 106, 108, 110 may serve as clients for server 102 and/or as clients and/or servers for each other and/or for other components connected to LAN 100. Components on LAN 100 are preferably connected together by cable media, for example unshielded twisted pair (UTP) Category 5 copper cable, and the network topology may be an Ethernet topology 114. It should be apparent to those of ordinary skill in the art that other media, for example, fiber optic or wireless radio frequency media, may also connect LAN 100 components. It should also be apparent that other network topologies, such as Token Ring, may be used.

Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and routers that connect them must adhere to a standard protocol. Computer networks connected to the Internet and to other networks typically use TCP/IP Layering Model Protocol. It should be noted that other internetworking protocols may be used.

Figure 2:
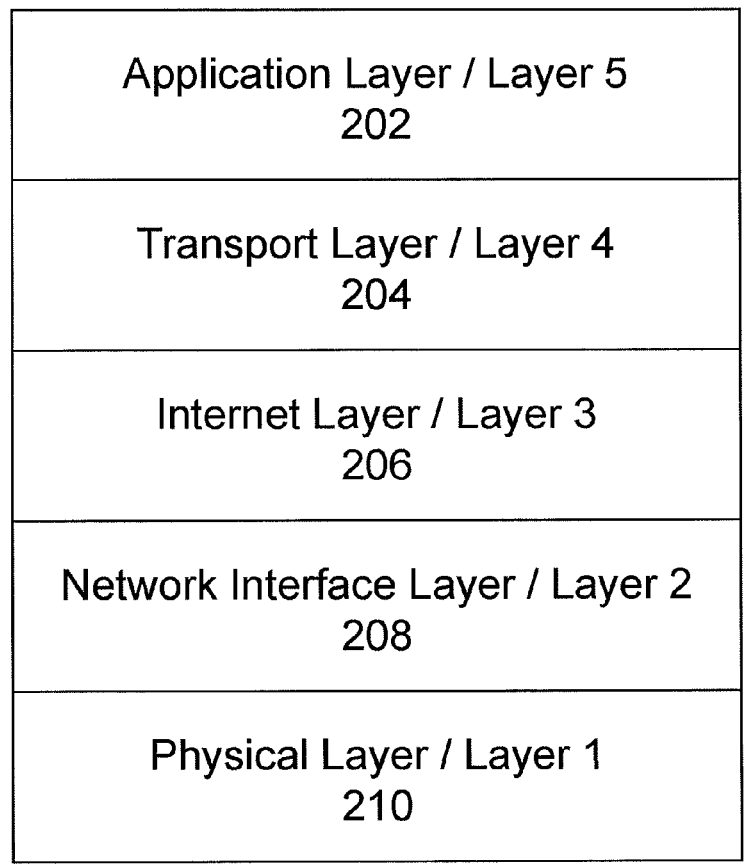
FIG. 2 illustrates the TCP/IP Layering Model.

FIG. 2 illustrates the TCP/IP Layering Model, which is comprised of an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

Figure 3:
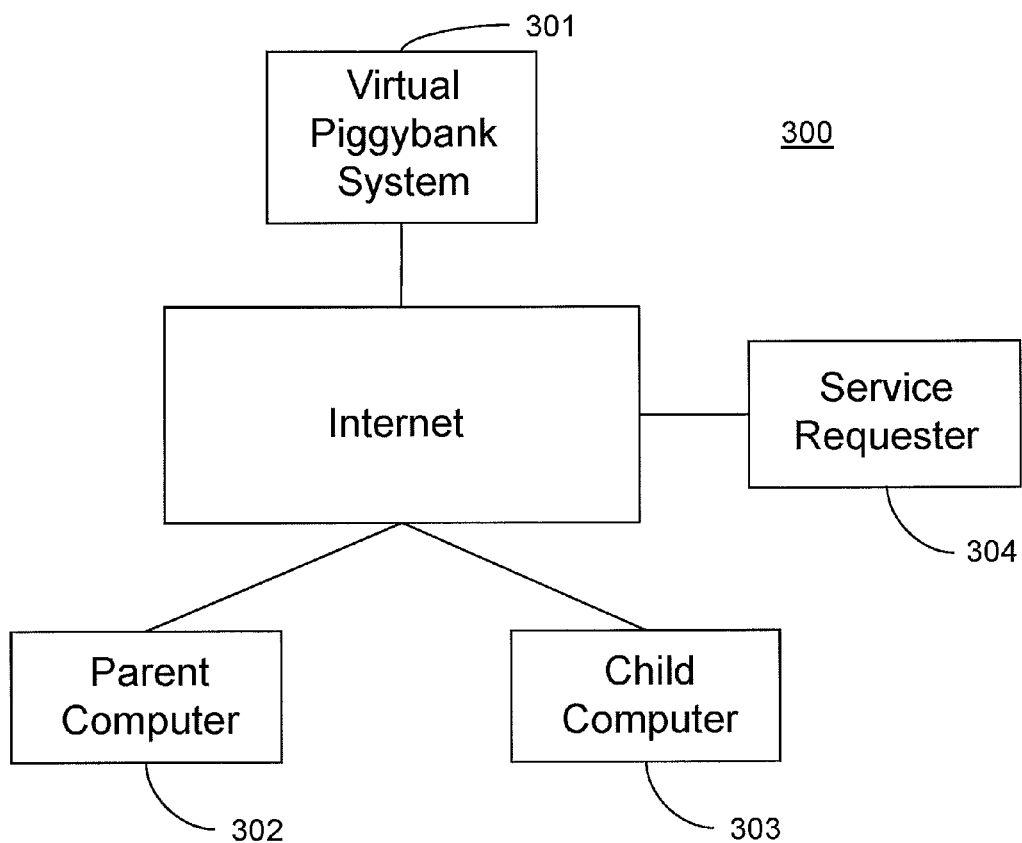
FIG. 3 illustrates a virtual piggybank system according to an exemplary embodiment of the present invention.

FIG. 3 illustrates a virtual piggybank system according to an exemplary embodiment of the present invention.

As shown in FIG. 3, the virtual piggybank system 300 includes a virtual piggybank server 301, parent computer 302, child computer 303, and service requester 304. The virtual piggybank server 301 may include a persistent software system and service that allow one or more persons responsible for one or more children to establish a controlled money management and payment system for use over the Internet. The adult preferences are stored on a database, and include parental/guardian/custodian preferences and controls for the money management. The system provides an Application Programming Interface (API) that exposes software functions that other websites, web services and Internet enabled desktop applications can use to enforce the adult preferences when children try to purchase items online. The websites, web services and Internet enabled desktop applications partner with the present system ("virtual piggybank"), and an account is created. Each of the parent computer 302 and child computer 303 may be a desktop computer, laptop computer, tablet or portable computer, smartphone, mobile phone, or other portable computing device. Service requester 304 may include any online application such as websites, online stores, online games, and online applications.

The following description uses as an example a parent as the person desiring to set controls regarding Internet use and a child as being the Internet user who will be controlled. These are only examples, and the invention is not limited to those two classes of people. For example, the following description would be equally applicable to an employer and employee.

Figure 4:
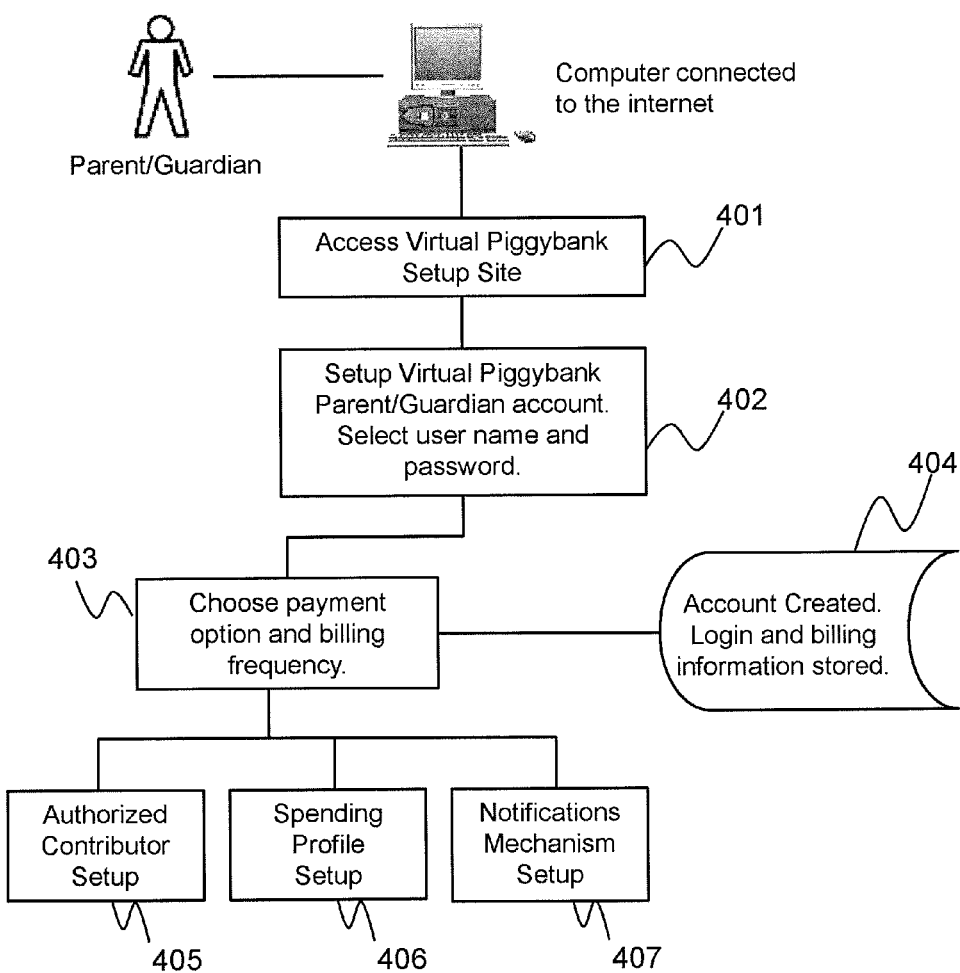
FIG. 4 is a flow chart illustrating a method for implementing a virtual piggybank according to an exemplary embodiment of the present invention using a direct deposit account and debit card.

FIG. 4 is a flow chart illustrating a method for implementing a virtual piggybank according to a first exemplary embodiment of the present invention.

At step 401, a parent accesses the virtual piggybank system via the Internet to establish a virtual piggybank for a child. For example, the virtual piggybank may be an Internet bank account with a debit card for use by a child, but the virtual piggybank is not limited to this. In order to establish a virtual piggybank for a child, a parent may first establish a parental account.

At step 402, a parent or guardian may establish a parental account. The virtual piggybank system may guide the parent through the set up of a parental account. To establish a parental account, a parent profile is created. A parent profile allows a parent to provide information that allows the virtual piggybank system to interact with a parent. For example, the virtual piggybank system may support OpenID. A parent may be able to use an OpenID account to establish a parent profile. However, the virtual piggybank system may request additional information as well, such as a password, name (first, middle and last), address information, verification preference such as e-mail or short message service (SMS) that is used to verify a parental account, primary phone number, mobile phone number that may be used if SMS is selected as a verification preference so that SMS messages may be sent to a mobile phone, a primary e-mail address that may be used if e-mail selected as verification preference, secondary e-mail, password reminder questions, time-zone such that dates and times in the virtual piggybank system are based on this time-zone and not the time-zone of the server, and currency preferences.

The parental account is secure and can only be accessed with the correct user name and password. All data transmissions may be encrypted and secure, such as all profile information. Passwords that may be used by the parent, child or others designated to properly use the system may have expiration dates to insure password strength. After a parental account is established, a parent may then establish one or more child accounts. The settings of a child account may then be controlled by the parental account. For example, the virtual piggybank system may present a number of options from which a parent may choose such that various controls may be imposed on a child by the virtual piggybank.

At step 403, the virtual piggybank has the parent choose a payment option and/or billing frequency. The information supplied here also will be secured through encryption and passwords A parent may establish one or more payment accounts. A payment account is the account that will be used to make payment for purchases made by a child via a child account. In an embodiment of the present invention the system partners with a bank that provides a demand deposit account that a parent opens in the child's name. The account has a debit card associated with it and this debit card is used by the system instead of a parent's credit card to fund the child's transaction. The inventive system is the online interface with the bank account. Of course, the payment account may be any known to those skilled in the art.

The partner bank may provide a user name and password associated with a direct deposit account so that payments made with the debit card from a child account may be charged to the direct deposit account. The virtual piggybank system may verify the validity of the account using the adaptive account API for Authentication. Accordingly, the partner bank may provide the following information relating to a direct deposit account: a) account name; b) account user name and password; c) account billing address (e.g., street number, street name, city, state, zip, country); and d) whether to accept outside payments to determine if someone else can fund this account. The last option will be discussed later.

At step 404 a direct deposit account is created. In addition, one or more child accounts also may be created at this time. Account information, such as a user name, password, or payment information may be stored in a secure database by the virtual piggybank server.

At step 405, the virtual piggybank system may allow the parent to designate one or more contributors to a child account. A contributor may be a person other than a parent who may add money into the direct deposit account. For example, a grandparent, uncle, aunt, or other close family member may be designated as a contributor. The virtual piggybank system may allow a parent to impose one or more controls on a contributor. For example, a parent may designate a money limit that a contributor may add to a child account. Such a money limit may be determined by the total amount of money that is presently available to a child in a child account. Alternatively, a money limit may be applied per contributor. In addition, a parent may limit the frequency with which a contributor may add money to a child account.

For example, a parent may designate a person as a contributor by providing that person's name and e-mail address to the virtual piggybank system. The virtual piggybank system may send an e-mail along with an authentication code and a link to a contributor. This link may not expire so that a contributor person can bookmark this page to send repeatedly money when he/she wants. A contributor may then go to the link in the e-mail, enter the code, the validity of which is then determined, and if the code is valid then a contributor may be presented with a form that will allow them to enter their credit card information or payment account information, such as a PayPal or Google account.

To establish child accounts, a child profile or profiles are created as mentioned at step 404. A child profile may include a user name, password, and payment method, such as the debit card account. A child may use the user name and password to conduct transactions on websites, online games and online applications that are approved by a parent through the virtual piggybank system.

Figure 10:
FIG. 10 illustrates an exemplary preferences add child profile screen according to an exemplary embodiment of the present invention.

Referring to FIG. 10, illustrated is an exemplary add child profile set-up screen according to an exemplary embodiment of the present invention.

As shown in FIG. 10, the add profile screen 1000 may be divided into several exemplary screen portions 1001-1006. At screen portion, 1001 a parent may identify a child by name or nickname. Also, a child may be given a child account user name (i.e., Virtual Piggy ID) that is associated with a parent account user name (i.e., Parent Match ID).

At screen portion 1002, a parent may authorize service requesters, including websites and other Internet based applications that a child may visit, from which a child may make purchases, etc. A parent can control whether every service requester needs to be approved by a parent. The parent can also selectively define which service requesters need to be approved while other services may be automatically approved.

At screen portion 1003, a parent may approve transactions from the child account based on a spending amount. A spending limit that limits the amount of money that a child can spend without obtaining parental approval, or a periodic spending limit that limits the amount of money a child can spend on a periodic basis such as per day, per week, per month, or over any particular time limit. Alternatively, a parent may set a spending limit that limits the amount of money a child can spend on an occasional basis, such as a child's birthday or other holiday. In another alternative, a parent may specify a payment account balance limit such that if the linked payment account balance goes below a specified balance, no additional transactions will be permitted from a child account linked to it.

At screen portion 1004, a parent may designate contributors to a child account. For example, a contributor may be another parent, grandparent, aunt, uncle, or other adult responsible for a child. At screen portion 1005, a parent may specify that notifications be sent for information including alerts regarding transactions, contributions, and the dashboard for the child account. Notifications may be sent by e-mail, SMS, voicemail, or the like. In addition, a parent may specify that notifications be sent to a contributor. At screen portion 1006, a parent may authorize certain service requesters for use by a child.

Referring back to FIG. 4, at step 406, the virtual piggybank system may allow a parent to setup a child profile. The virtual piggybank system may allow a parent to impose one or more controls on a child by setting up a child profile. A child profile may include a list of approved websites (i.e., Service Requester of FIGS. 3, 8, and 10) where a child is authorized to spend money from a child account, a spending limit that limits the amount of money that a child can spend without obtaining parental approval, or a periodic spending limit that limits the amount of money a child can spend on a periodic basis such as per week, per month, or over any particular time limit. Alternatively, a parent may set a spending limit that limits the amount of money a child can spend on an occasional basis, such as a child's birthday or other holiday. In another alternative, a parent may specify a payment account balance limit such that if the linked payment account balance goes below a specified balance, no additional transactions will be permitted from a child account linked to it.

In addition, the virtual piggybank also may allow a parent to specify a time period during which a child may spend money from a child account. For example, a time period may be certain hours of the day, certain days of the week, or any period so desired.

At step 407, the virtual piggybank system may allow a parent to setup specific notifications. Notifications may be sent by e-mail, SMS, voicemail, or the like. Such notifications may include any information regarding the account, such as funds, usage, etc. For example, a parent or contributor may receive notifications concerning the amount of money available to a child or recent purchases of a child, if more than a certain number of transactions are carried out at a particular merchant or by a child over the course of a day, if suspicious behavior occurs (such as a number of unsuccessful login attempts or simultaneous login attempts were made). In another example, a parent or contributor may receive a notification requesting approval of a particular transaction of the child account. In this example, a reply SMS message or e-mail may be sent by a parent or contributor to approve a transaction. Alternatively, the virtual piggybank system may provide one or more links that may be clicked upon to approve or decline a particular transaction. If a notification is provided by phone, a request for approval may be requested after the recital of an automated message, and approval may be solicited through key selection.

Figure 5:
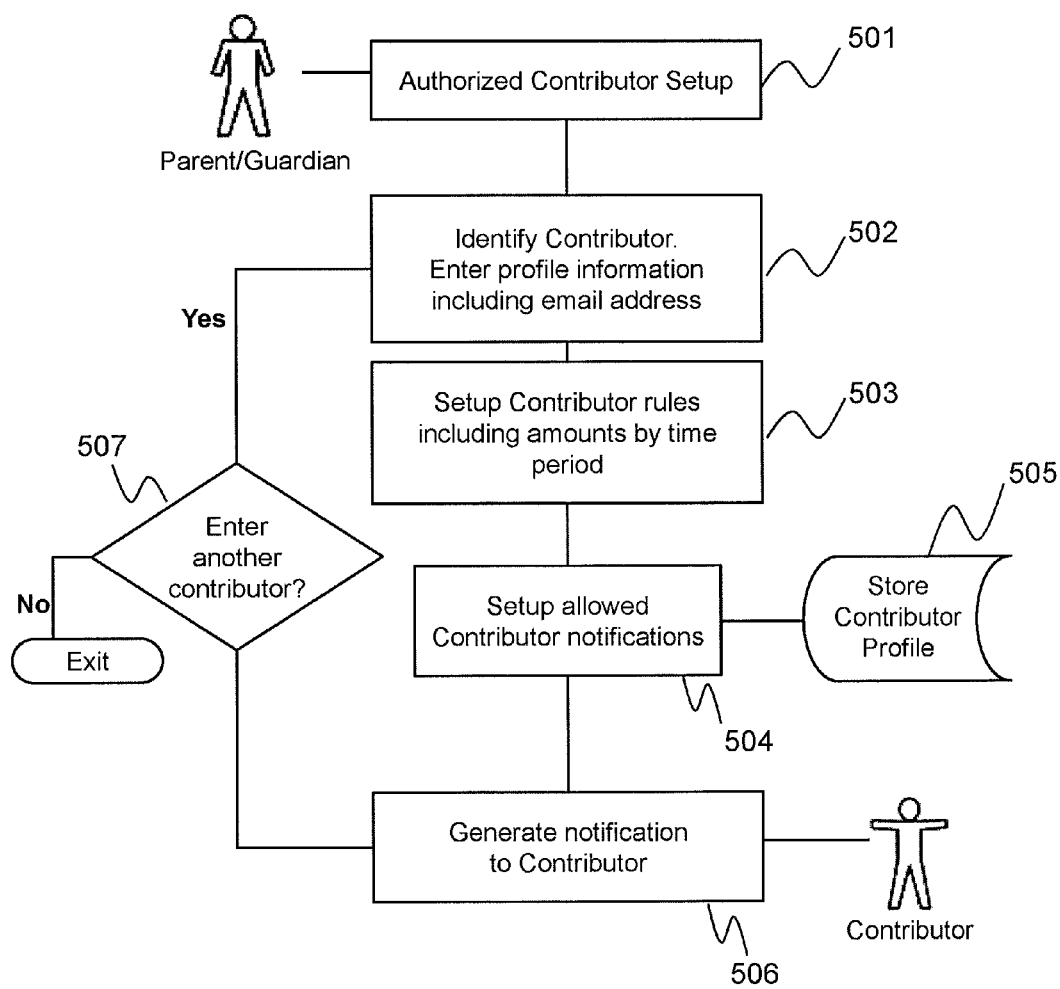
FIG. 5 is a flow chart illustrating a method for authorizing a contributor according to an exemplary embodiment of the present invention.

FIG. 5 is a flow chart illustrating a method for authorizing a contributor according to an exemplary embodiment of the present invention.

At step 501, a parent accesses the virtual piggybank system and selects an option to change the Authorized Contributor Setup. As discussed above, a contributor may be a person other than a parent who may add money into the direct deposit account for the child of the virtual piggybank system. The virtual piggybank system may allow the parent to designate one or more contributors to a child account.

At step 502, a parent enters profile information for a contributor that that will be authorized by a parent to contribute funds to a child's account in the virtual piggybank. The profile information may include the contributor's name, address, email address, and any other information that will uniquely identify the contributor.

At step 503, the virtual piggybank system may allow a parent to impose one or more controls on a contributor. A parent is presented with a variety of controls that may be applied to a contributor regarding contributions that may be made to a child account. For example, a parent may designate a money limit that limits the amount of money a contributor may add to a child account. Such a money limit may be determined by the total amount of money that is presently available to a child account. Alternatively, a money limit may be applied per contributor. In addition, a parent may limit the frequency with which a contributor may add money to a child account.

At step 504, the virtual piggybank system may allow a parent to set specific notifications to be sent to a contributor. Such notifications may include any information regarding a child account, such as funds, usage, etc.

At step 505, profile information for a contributor is stored in a secure database by the virtual piggybank system. Account information such as a user name, password, or payment information, and notification sending information may be stored in a secure database by the virtual piggybank system.

At step 506, a parent then selects a notification mechanism that the virtual piggybank sends to the contributor. For example, a notification may be sent by e-mail, SMS, or voicemail. Of course, notifications also may be sent to a parent.

At step 507, a parent is given the option of adding additional contributors. If a parent desires to add an additional contributor, a parent again enters profile information for a contributor at step 502, and again proceeds through the steps outlined above.

Figure 6:
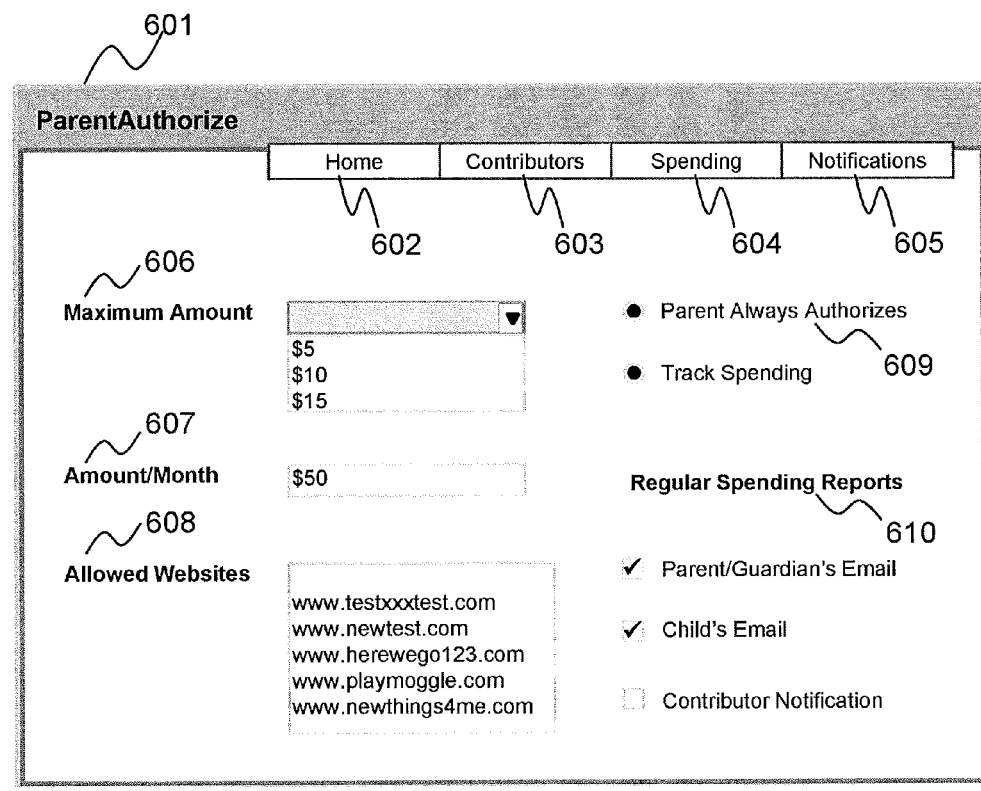
FIG. 6 is an exemplary screen shot of the preferences setup according to an exemplary embodiment of the present invention.

FIG. 6 is an exemplary screen shot of the preferences setup according to an exemplary embodiment of the present invention. Virtual piggybank may be implemented as a secure website a parent sees when setting up the preferences. Parent window 601 illustrates the main parental authorized information, which may include a Home tab 602, Contributors tab 603, Spending tab 604 and Notifications tab 605. The Home tab 602 may contain the general preferences for the parent, including basic contact information for the parent; email, fax, phone, etc. The Contributors tab 603 may hold preferences associated with the authorized contributors. The Spending tab 604 may contain information and preferences related to a child's allowed spending capabilities. This information may include, but is not limited to the maximum amount in a single transaction 606, total spending amount per month 607, websites on which the child may spend funds from the virtual piggybank 608, preferences around parental authorization (e.g., all purchases, purchases over a certain amount, purchases of certain types of product) 609, and preferences around who receives reports and notifications of child's actual spending 610 and frequency of reports.

Figure 7:
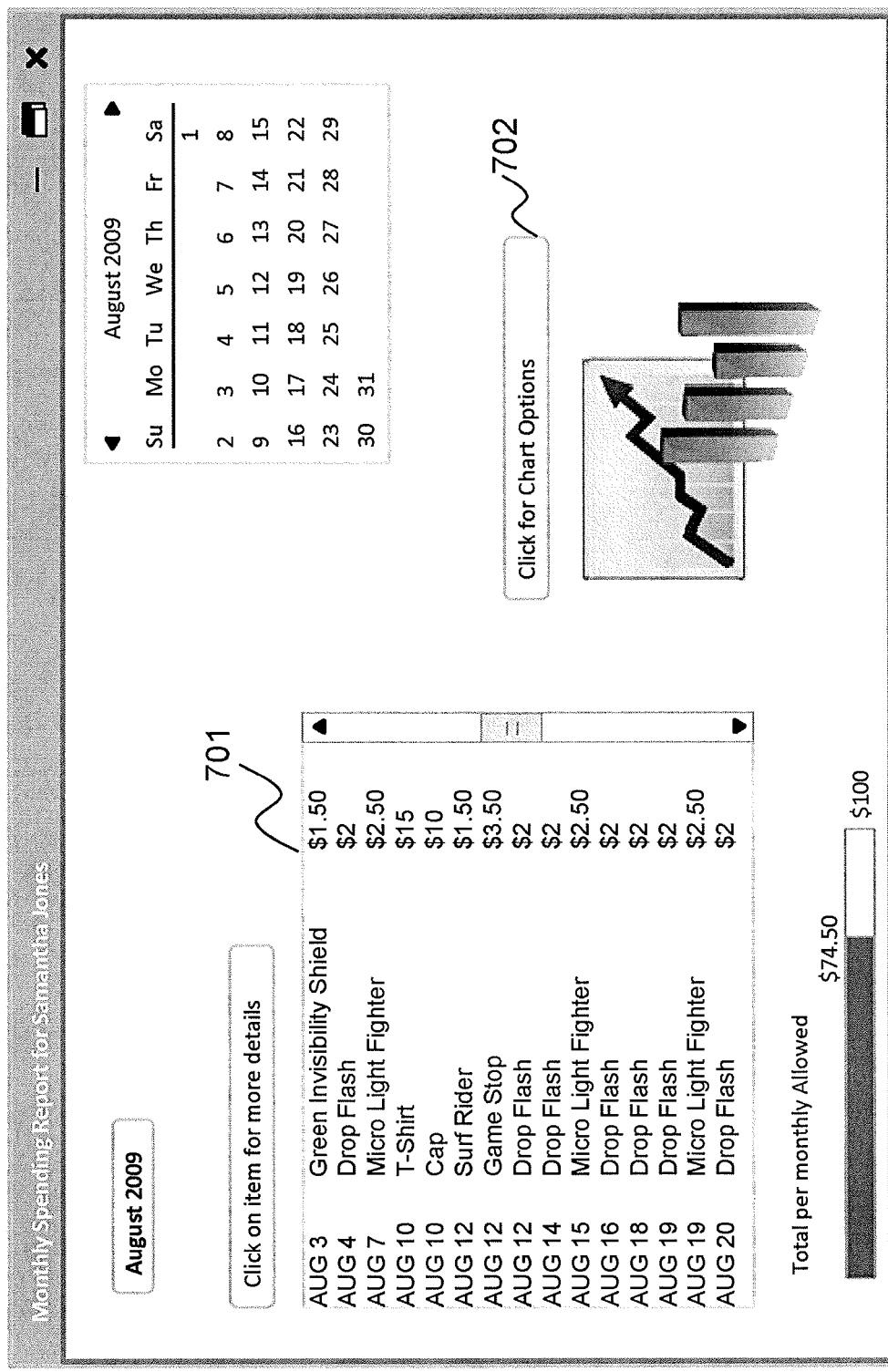
FIG. 7 is an exemplary monthly spending report according to an exemplary embodiment of the present invention.

FIG. 7 is an exemplary monthly spending report according to an exemplary embodiment of the present invention. The monthly report may contain information about the child's spending patterns 701 including an itemized list of all purchased items with the ability to drill down and get further details on the item. Further details would show information, such as the website from which the item was purchased, the total amount spent on that website to date, the time of purchase, etc. A parent may be able to see a child's spending patterns compared to prior months and compared to the total monthly spend allowed. A parent may also be able to chart the child's spending data 702, and in the case of a multi-child family, the parent will be able to compare the profiles of all of their children.

A parent may view a spending report by logging into the virtual piggybank system. A spending report may be an onscreen report that a parent can print or e-mail if desired. A spending report is customizable, and may show any combination of transaction dates, transaction amounts, service requesters, daily, weekly and monthly sub-totals. For example, a spending report may be generated for a particular service requester.

Figure 8:
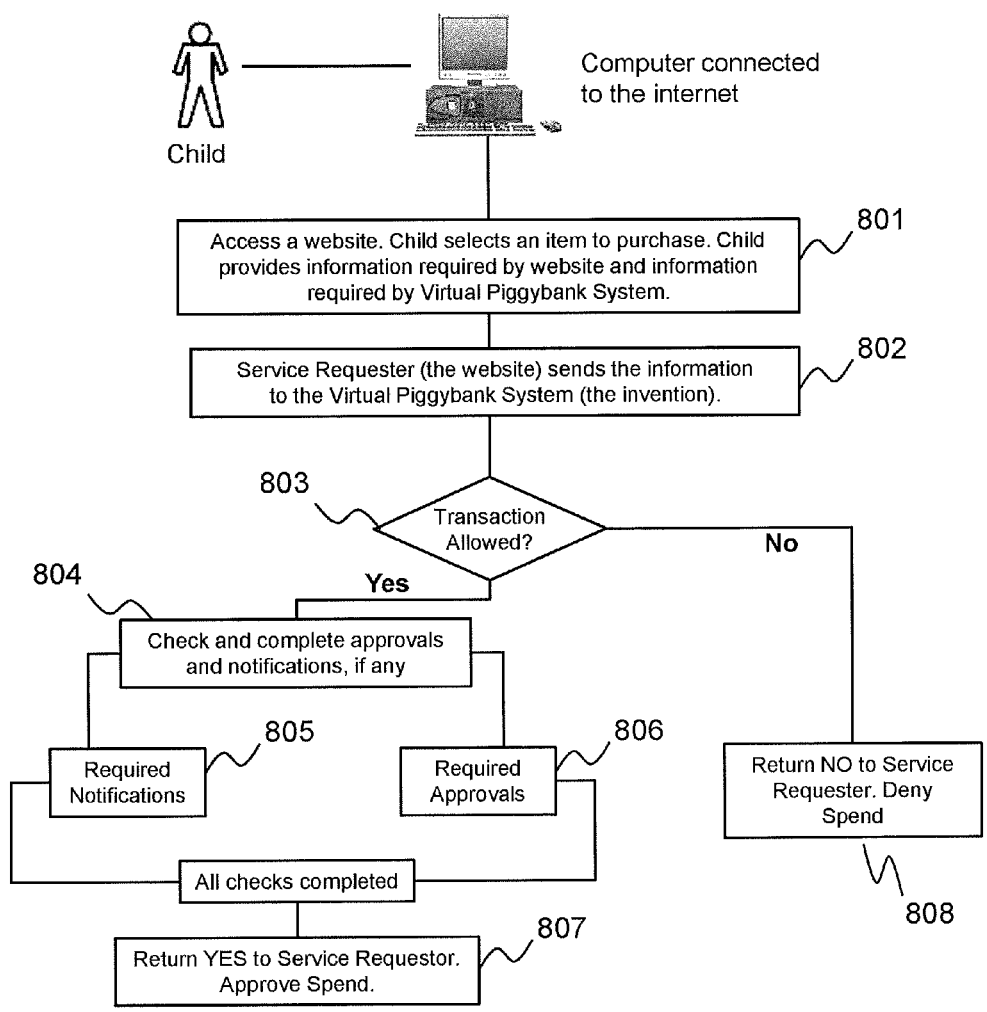
FIG. 8 is a flow chart illustrating a method for implementing the spending functionality of virtual piggybank according to an exemplary embodiment of the present invention.

FIG. 8 is a flow chart illustrating a method for implementing the child spending functionality of virtual piggybank according to an exemplary embodiment of the present invention.

At step 801, a child accesses an Internet website and selects an item for purchase. Here, the virtual piggybank system may first determine whether a parent has allowed a child to access the website that the child is attempting to access. If a child is allowed to access the website, a child may then enjoy the website's content. Otherwise, a child may be redirected to an alternate website.

At step 802, the website (i.e., Service Requester) makes a request to the virtual piggybank system. The request package contains all the required information necessary to identify the child attempting to make a purchase to the virtual piggybank system plus all the information about the proposed transaction.

A service requester may establish a merchant account with the virtual piggybank system. The merchant account allows a service requester to provide information to the virtual piggybank system to contact the service requester. For example, the virtual piggybank system may support OpenID. A service requester may use their OpenID account to setup a merchant account. In addition, a service requester may establish a payment acceptance account. This account will be used to accept payment. For example, a service requester may use PayPal or a Google account linked with a bank account associated with the service requester. The virtual piggybank system may verify the validity of the account using the adaptive account API for Authentication.

At step 803, the virtual piggybank system examines the request. In particular, the request is checked against a child profile to determine whether a transaction is allowed or not. A child profile includes information necessary to determine whether a transaction is allowed. For example, a child profile may include a list of approved websites where a child is authorized to spend money from a child account, a spending limit limiting the amount of money that a child can spend without obtaining parental approval, or a periodic spending limit limiting the amount of money a child can spend per week or per month, or over any particular time limit. In addition, the virtual piggybank system also may allow a parent to specify a time period during which a child may spend money from a child account.

The virtual piggybank notifies the service requester whether the transaction is approved or not at steps 807 and 808, respectively. At the same time, if the transaction is approved, the virtual piggybank system may determine whether further approvals and/or notifications are required at step 804. If notifications are required, the required notification is sent to a parent or contributor, as appropriate, at step 805. Similarly, if a further approval is required, a seeking approval message is sent to a parent or contributor, as appropriate, at step 806. For example, an e-mail or SMS containing a seeking approval message may be sent to a parent or contributor. A parent or contributor may approve the pending transaction in a variety of ways such as reply SMS message, return e-mail, or by logging onto a parental or contributor account.

Thus, when a child logs onto the Internet and attempts to make a purchase at a Service Requester site that was previously designated as controlled by the virtual piggybank, the Service Requester bank makes a web service call to the virtual piggybank. The virtual piggybank exposes the preferences that were established by an adult, as described above, to the Service Requester. The preferences may be exposed to the service requester via an application programming interface through a web service, which may be a software system designed to support interoperable machine-to-machine interaction over the Internet.

Figure 9:
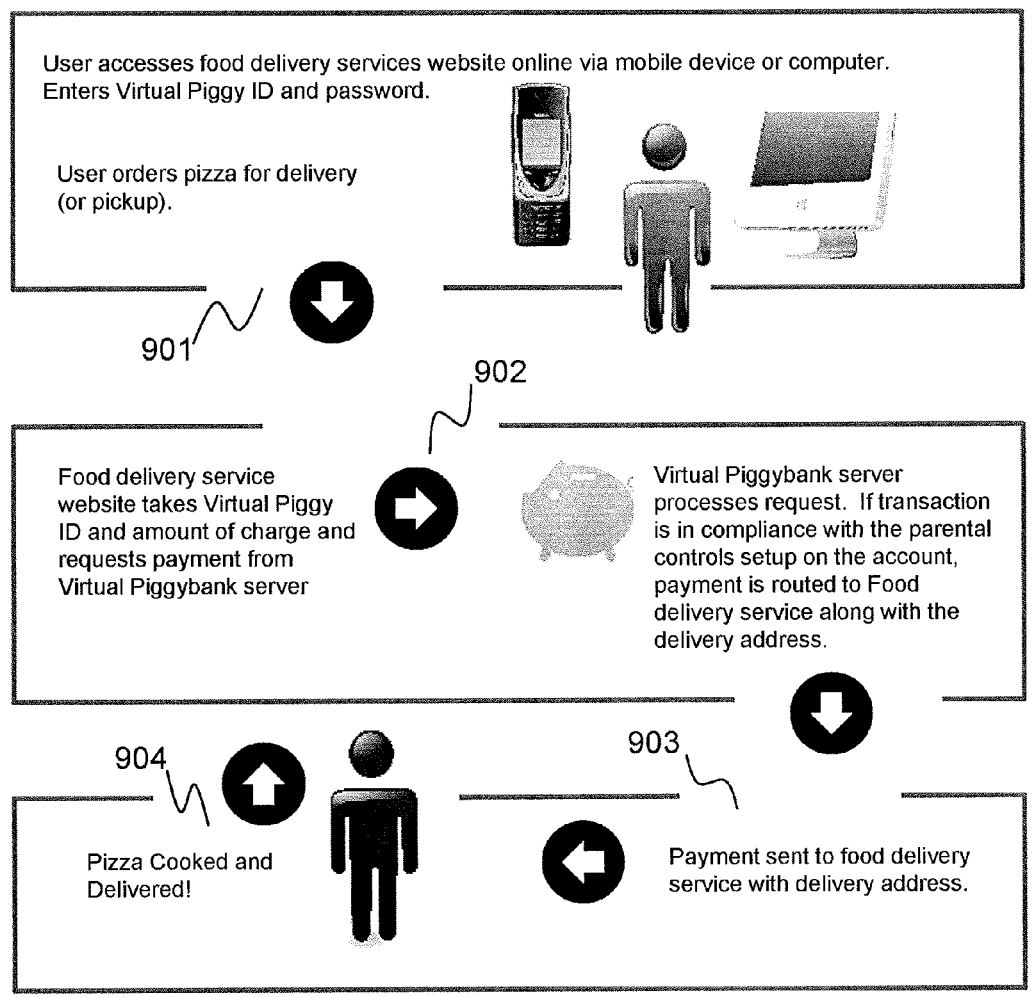
FIG. 9 illustrates an exemplary application of the virtual piggybank according to an exemplary embodiment of the present invention.

FIG. 9 illustrates an exemplary application of the virtual piggybank according to an exemplary embodiment of the present invention.

As shown in FIG. 9, a child user of a child account may access a service requester, such as a restaurant or food delivery system, at step 901. In this example, the service requester may obtain child account identifying information and present the child account information to the virtual piggybank system at step 902. Once the method for implementing the child spending functionality of virtual piggybank, as shown in FIG. 8, is performed and the service requester approved, a purchase from the service requester may be made. The virtual piggybank system then ensures that the service requester is paid for the selected service or item, at step 903. Accordingly, the service requester may then provide the purchased service or item, as shown in step 904.

As discussed above, a service requester may establish a merchant account with the virtual piggybank system. A merchant account allows a service requester to provide information to the virtual piggybank system to contact the service requester. For example, the virtual piggybank system may support OpenID. A service requester may use their OpenID account to setup a merchant account. In addition, a service requester may establish a payment acceptance account. This account will be used to accept payment. For example, a service requester may use PayPal or a Google account linked with a bank account associated with the service requester. The virtual piggybank system may verify the validity of the account using the adaptive account API for Authentication.

The virtual piggybank system may generate revenues by charging service requesters a fee per transaction. For example, the virtual piggybank system may use a payment account, such as a PayPal or Google account, as a payment network. The payment account may charge its standard rate (on average 2.9%+0.30 USD per transaction) in addition to the virtual piggybank rate.

Figure 11:
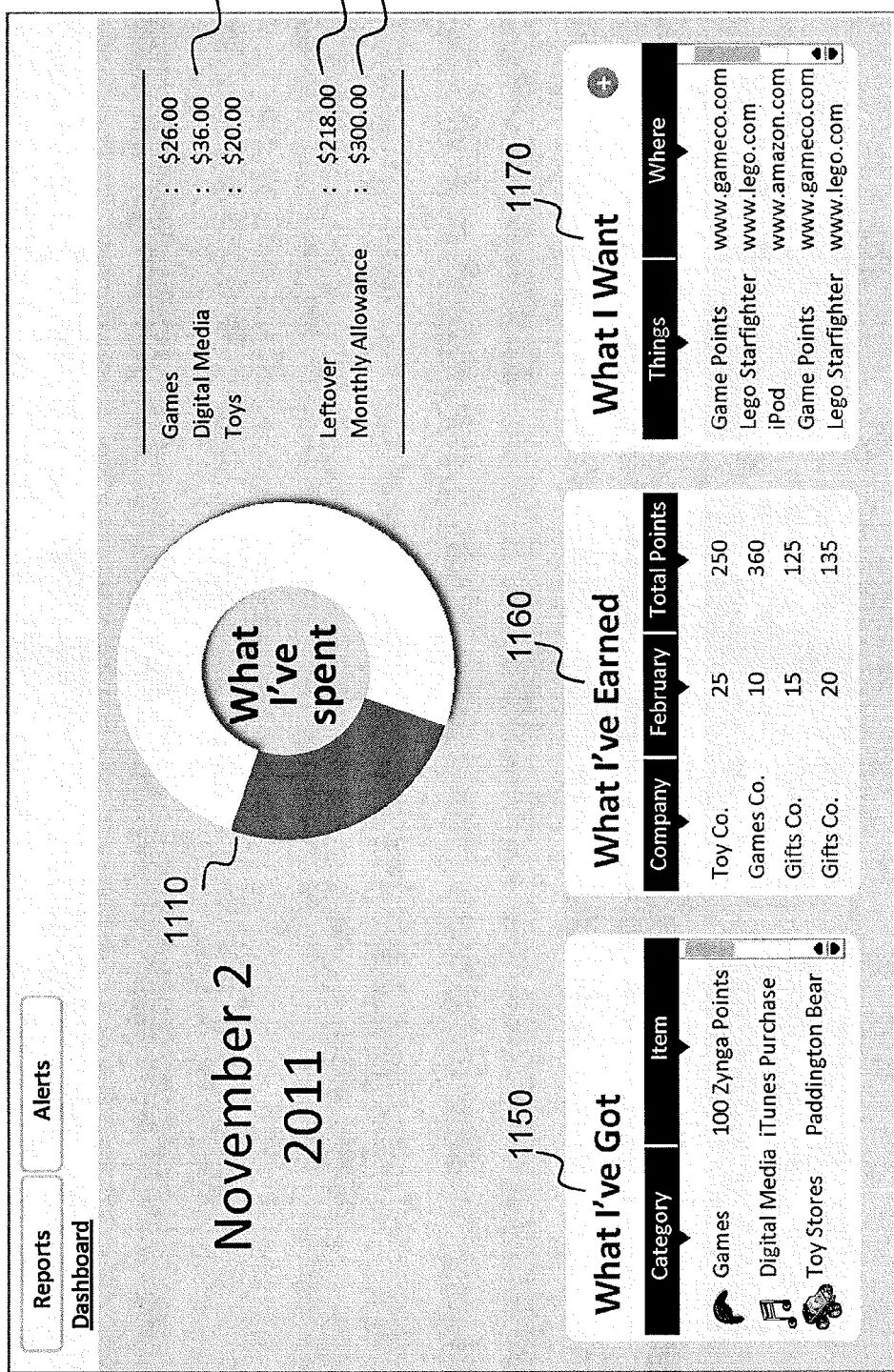
FIG. 11 illustrates the dashboard functionality according to an exemplary embodiment of the present invention.

FIG. 11 illustrates the website dashboard of the present invention. As shown, the dashboard is a webpage and view that a child, who is registered with the system, may access. As shown, 1110 provides information to the child as to how much money has been approved for the child to spend, 1120 shows the child how much money has been spent, and 1130 shows the child how much money is left to spend. This information may be updated on a monthly basis, or whatever time limitation the child wants to view. The dashboard also may have an alternate view, 1140, which illustrates exactly how the funds were spent, such as showing amounts spent on games, digital media, toys, etc. The dashboard also provides a list of items already purchased through the virtual piggybank system at 1150. This list may be broken down into categories of items, such as games, digital media (music, movies, etc.), toys, educational items, etc. At 1160, the dashboard may show the child different items and/or money totals that have been earned to date. The dashboard also may allow the child to set up a wish-list of items desired at 1170. This list may be broken down into categories, such as games, digital media, toys, educational items, etc.

In the wish-list shown as item 1170 in FIG. 11, the child may click the plus (+) symbol on the dashboard screen to add a wish-list item from the list of approved service requesters authorized at screen portion 1006 in FIG. 10 by the parent.

Figure 12:
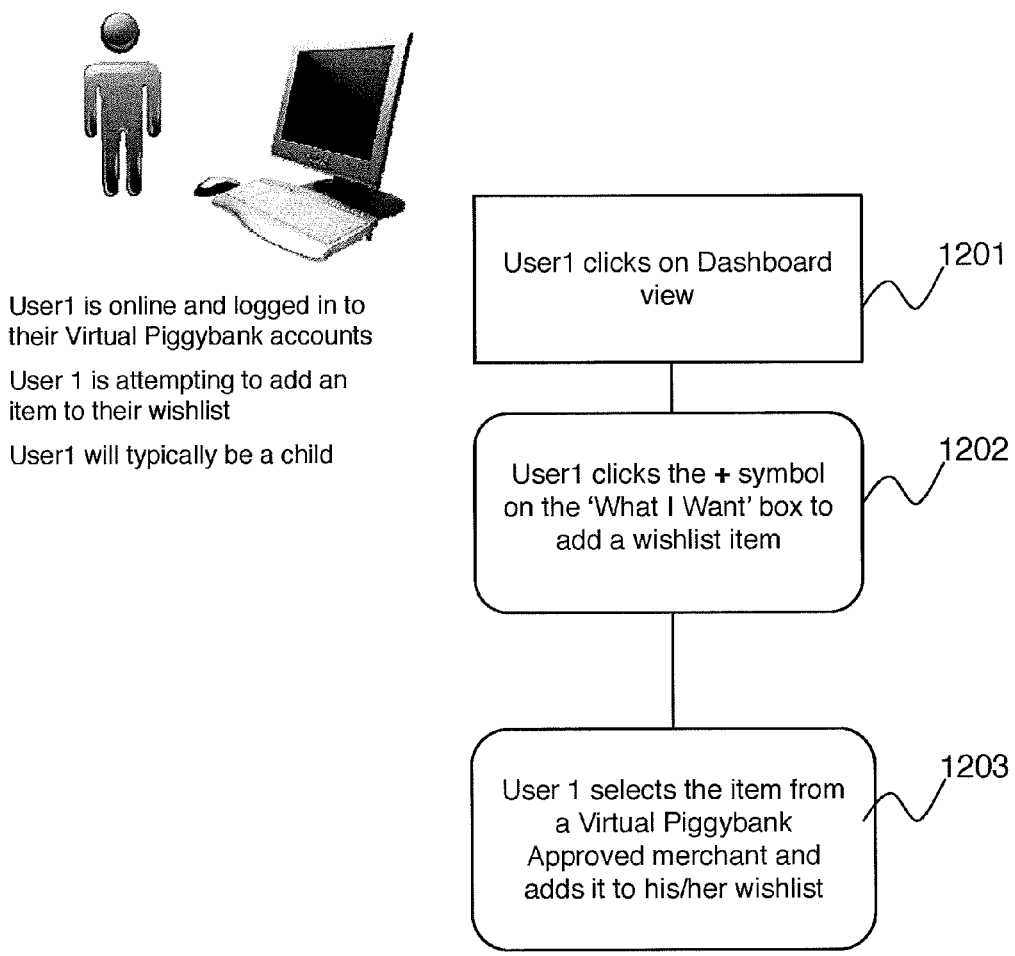
FIG. 12 is an exemplary flow-chart illustrating a method of adding an item to a wish-list according to an exemplary embodiment of the present invention.

FIG. 12 is an exemplary flow-chart illustrating a method of adding an item to a wish-list according to an exemplary embodiment of the present invention.

FIG. 12 shows a flow-chart outlining the ease in which a child may add desired games, digital media, toys, etc. to a wish-list. In FIG. 12, the child accesses the dashboard screen 1201, clicks the plus (+) symbol on the dashboard screen 1202, and selects the desired item from the approved service requester's website to add it to the wish-list.

Alternately, the child may select a desired item from a non-approved service requester's website. Before the item may be added to the wish-list, however, the parent is notified of the requested item and must approve or disapprove of the item before it is allowed to be added to the wish-list.

The wish-list provides accurate and timely information about what a child may desire or need, and allows the parent to control settings and preferences that allows contributors to access a child's wish-list and purchase items from the wish-list. A contributor may be a family member such as an aunt, uncle, cousin, or a close family friend, but may be any type of user not limited to parent and child who is authorized to access the wish-list. The virtual piggybank system may allow the parent to designate one or more contributors, and each contributor may be given access to one or more children from the same family or group.

Figure 13:
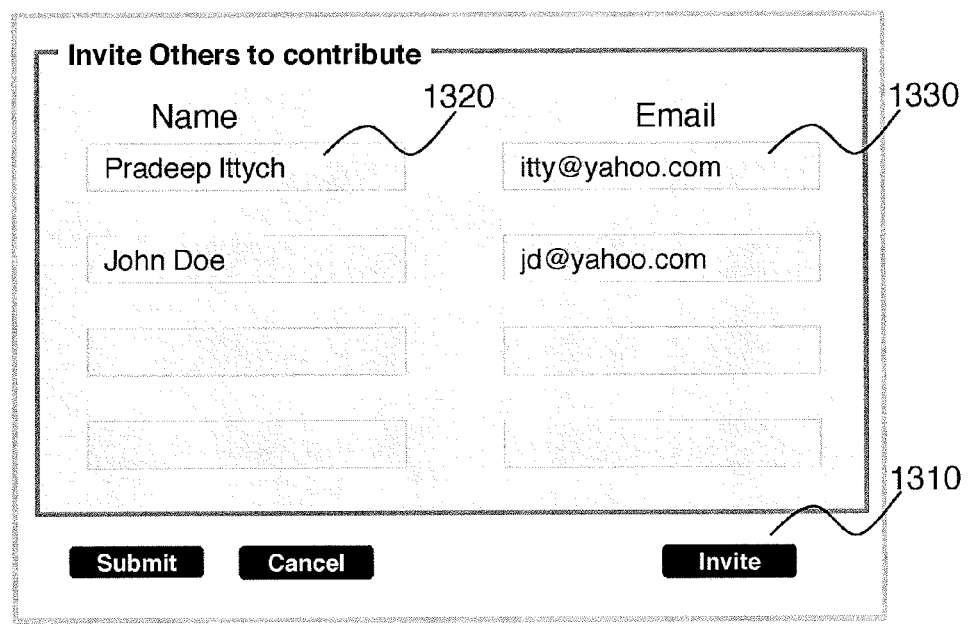
FIG. 13 illustrates an exemplary of an invitation screen of the virtual piggybank according to an exemplary embodiment of the present invention.

FIG. 13 illustrates an exemplary of a invitation screen of the virtual piggybank according to an exemplary embodiment of the present invention.

An "Invite" button 1310 located on the parent's home page allows the parent to designate a potential contributor by entering their name 1320 and email address 1330. The contributors are contacted similarly to steps 404-405 described above, where an email is sent to a selected contributor with an authentication code and a link.

Figure 14:
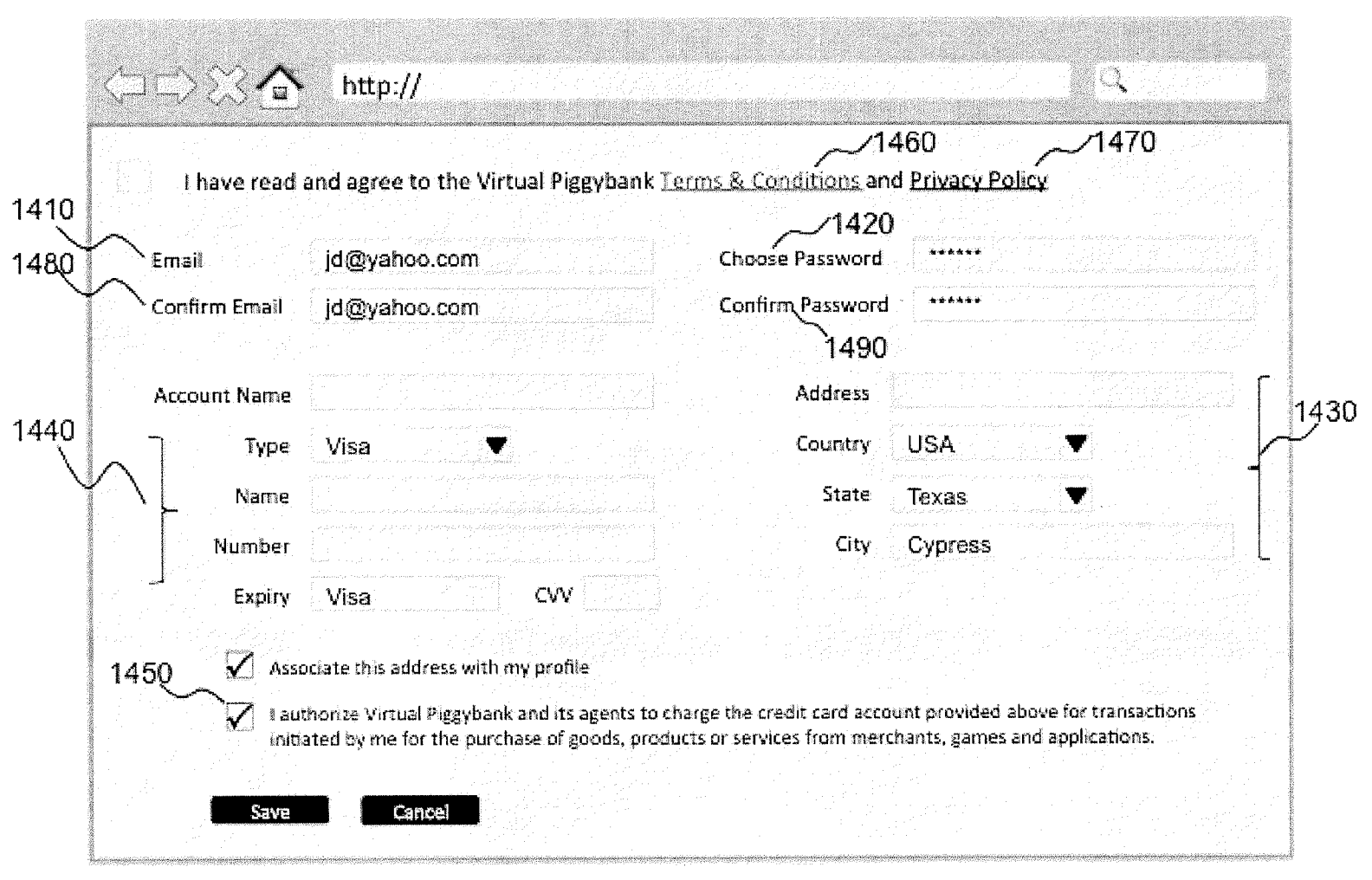

FIG. 14 illustrates an exemplary of a contributor sign-up screen of the virtual piggybank according to an exemplary embodiment of the present invention.

A contributor may click on the link, enter an authentication code, and may be presented with a sign-up screen where the contributor may provide email 1410, password 1420, address 1430, and payment account information 1440 to the virtual piggybank system. Unlike parental sign-up screens, the contributor does not have to agree to any merchant terms, and no details about the child's preferences are shown to the contributor. Authorization 1450, terms and conditions 1460, and privacy policy statements 1470 may be provided and must be approved by the contributor. Finally, confirmation email 1480 and password 1490 identifiers are requested to establish the contributor account.

Figure 16:
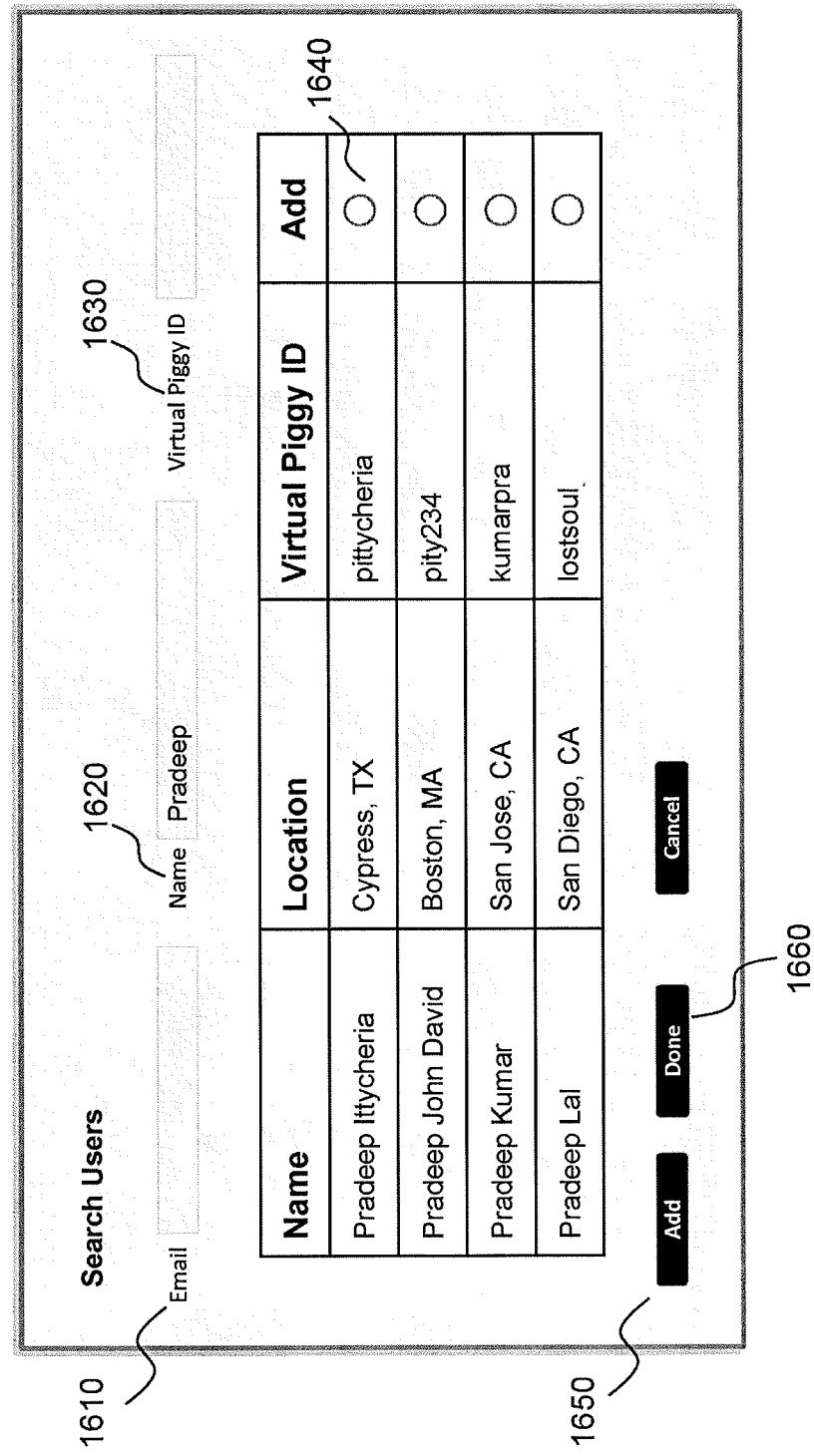
FIG. 16 is an exemplary search screen according to an exemplary embodiment of the present invention.

FIG. 15 is an exemplary child profiles screen and FIG. 16 is an exemplary search screen according to an exemplary embodiment of the present invention.

The parent may add or change contributors directly from the child profiles screen as shown in FIG. 15. The parent chooses a particular child and selects the "Add" authorized users link 1510 to associate one or more contributors with that child. Upon selecting the add link 1510, the parent is presented with a new screen (FIG. 16) where the parent can search the virtual piggybank database by email 1610, name 1620, or Virtual Piggybank ID 1630 for contributors or parents that match the search criteria. Multiple searches may be undertaken and a contributor from the search results may be selected by first clicking the "Add" radio button 1640 and then the "Add" button 1650. When the contributors, which may include parents, are selected, the parent may click the "Done" button 1660 to associate the contributors with the particular child. Only the authorized contributors and the initiating parent are allowed to see the child's wish-list.

FIG. 17 is an exemplary view of an authorized contributors screen according to an exemplary embodiment of the present invention.

Selecting the "Change" authorized users link 1520 for a particular child, as seen in FIG. 15, opens another screen that lists the previously authorized contributors to the child's wish-list. In FIG. 17, the parent may elect to remove one or more of the previously authorized contributors by clicking the "Remove" radio buttons 1710 for the selected contributors. When the contributors are selected, clicking the "Done" button 1720 will remove the selected contributors from access to the child's wish-list.

Figure 18:
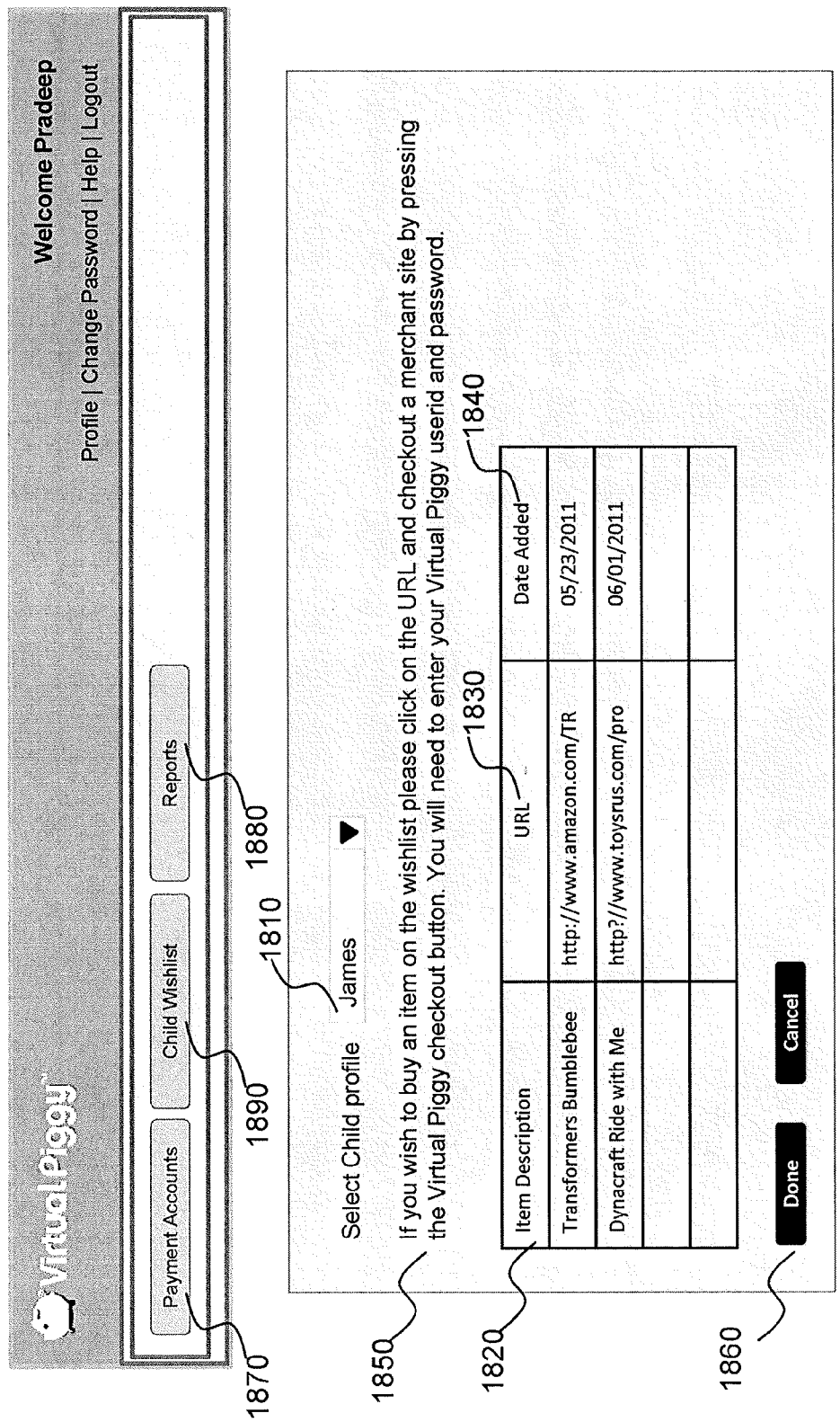
FIG. 18 illustrates an exemplary of a contributor's view of a child's wish-list according to an exemplary embodiment of the present invention.

FIG. 18 illustrates an exemplary of a contributor's view of a child's wish-list according to an exemplary embodiment of the present invention.

Upon entering the virtual piggybank system, a contributor is presented with a screen displaying a particular child's wish-list. A selection box 1810 allows the contributor to select the name of a child the contributor is authorized to view and purchase items from its wish-list. Each wish-list shows a description of selected items 1820, their Uniform Resource Locators (URL) 1830, and the date 1840 the items were added to the wish-list by the child. Instructions 1850 regarding the purchase of an item states that the contributor may click on a desired URL, click on the virtual piggybank's checkout icon at the merchant's website, and enter its Virtual Piggybank ID and password. Additional purchases may be made by repeating the aforementioned steps beginning with selection of the URL. When the contributor is finished purchasing items for a particular child, the "Done" button 1860 may be selected to complete the transactions.

Located above the contributor's wish-list screen, are buttons to provide access to the contributor's payment account 1870, reports 1880, and the wish-list 1890. The reports button 1880 shows the contributor all items purchased by the contributor for a particular child. The payment account button 1870 presents the contributor with their account information including billing information, and shipping information that may be passed onto the merchant for delivery of the purchased item to the contributor.

Figure 19:
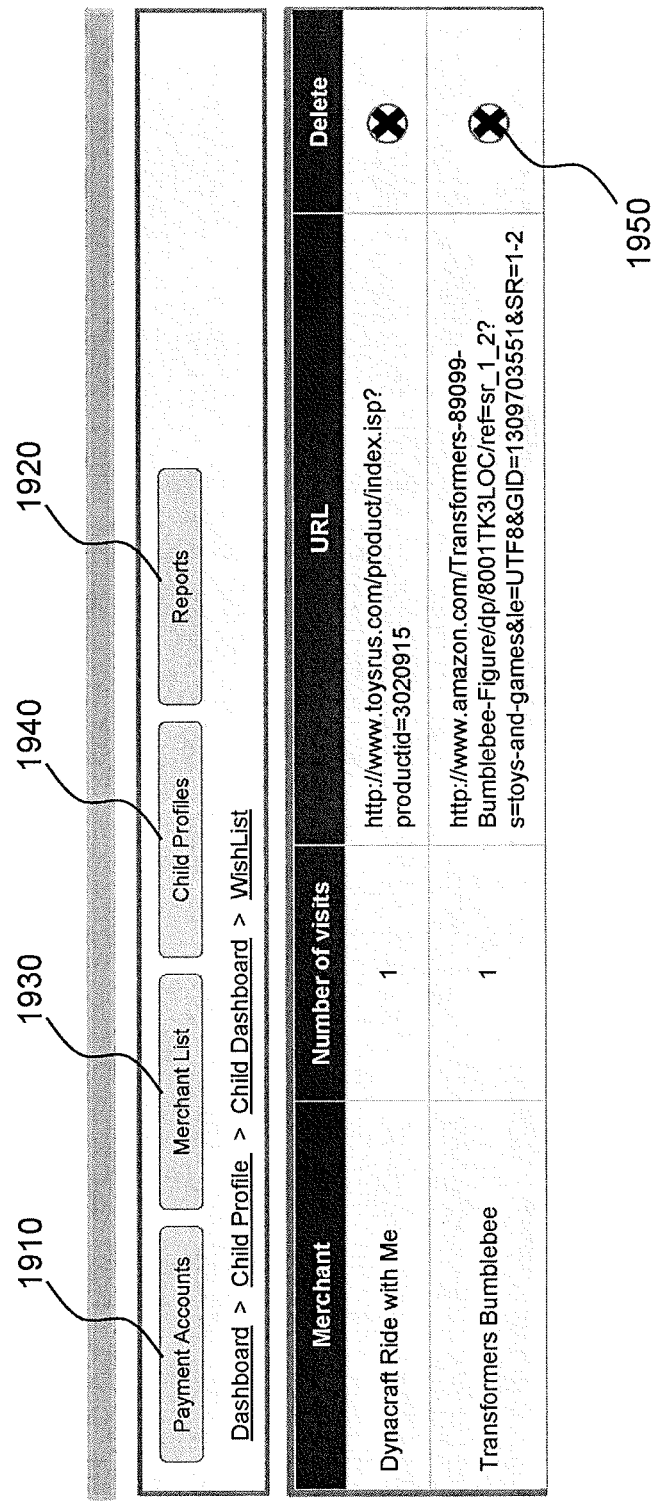
FIG. 19 illustrates an exemplary view of a parent's view of multiple child wish-lists according to an exemplary embodiment of the present invention.

FIG. 19 illustrates an exemplary view of a parent's view of multiple child wish-lists according to an exemplary embodiment of the present invention.

Similar to FIG. 15, the parent may have a view of multiple child wish-lists. The screen in FIG. 19 has buttons to provide access to the parent's payment account 1910, reports 1920, merchants 1930, and child's wish-list 1940. The reports button 1920 shows the parent all items purchased by a contributor for a particular child, including the merchant, date, and time of the purchase. The merchant button 1930 shows the merchant websites where a contributor has purchased an item for a particular child. The payment account button 1910 presents the parent with their own account information including billing information, and shipping information that may be passed onto the merchant for delivery of the purchased item to the parent.

Each child's wish-list may be accessed by the parent and edited. For example, the parent may elect to delete an item from a particular child's wish-list that the parent does not want the child to obtain. Deletion of the item is as easy for the parent as clicking on the "Delete" button 1950 identified with the wish-list item. A wish-list item deleted by the parent is then reflected in the contributor's and child's view of the wish-list. When a parent or contributor purchases an item from a child's wish-list, the item is removed from the child's wish-list and the parent's and contributor's view of the child's wish-list. While the removed item signals to the child an item from their wish-list has been purchased, the child is unaware of who may have purchased it.

Alternatively, the virtual piggybank system may be configured not to remove a wish-list item when a parent or contributor purchases an item from a child's wish-list. By not automatically removing the purchased item from the child's wish-list and the parent's and contributor's view of the child's wish-list, the child is completely unaware of the purchase and may be surprised upon receiving the item from a parent or contributor. If a contributor attempts to purchase the same wish-list item previously purchased by another contributor or parent for a particular child, the subsequent purchaser is notified that the selected item has been purchased in order to prevent redundant purchases.

Furthermore, the child's wish-list may be customized by the parent by setting controls where individual items on the wish-list are set to expire after a certain time period has elapsed and are automatically removed from the wish-list. Additional customizations and controls may be provided for the parent, and other information and methods of presenting information on a wish-list may be known to those skilled in the art and are incorporated herein.

It will be apparent to those skilled in the art that various modifications and variations can be made in the system and method for virtual piggybank of the present invention without departing from the spirit or scope of the invention. Thus, it is intended that the present invention cover the modifications and variations of this invention provided they come within the scope of the appended claims and their equivalents.

What is claimed is:

1. A computer-implemented method of establishing an online account for a prospective Internet user, comprising a non-transitory computer readable medium including a program and a computer executable program code, the method comprising:

establishing, at a server computer, a first account, settings of the first account being stored in a database in the server computer;

establishing, at the server computer, a second account by a user associated with the first account, settings of the second account being stored in the database, the second account comprising a wish-list, the wish-list comprising items from a plurality of service requesters who have been authorized by the user of the first account;

linking the first and second accounts such that the settings of the second account are determined through the first account; and selecting at least one wish-list item, wherein the settings of the second account do not allow item selection from one of the plurality of service requesters websites when a service requester's website is not authorized, but item selection may be later authorized by a custodian of the first account.

2. The computer-implemented method according to claim 1, further comprising searching for one or more contributors stored within the database.

3. The computer-implemented method according to claim 2, further comprising deleting one or more contributors to the database.

4. The computer-implemented method according to claim 1, further comprising adding one or more contributors to the database.

5. The computer-implemented method according to claim 4, further comprising authorizing one or more contributors to access the wish-list.

6. The computer-implemented method according to claim 5, wherein the authorizing includes sending an invitation to one or more contributors with an authentication code and a link to a sign-up screen.

7. The computer-implemented method according to claim 6, wherein the sent invitation includes one of an email and SMS.

8. The computer-implemented method according to claim 5, further comprising purchasing an item from the wish-list by one or more contributors.

9. The computer-implemented method according to claim 8, further comprising removing the purchased item from the wish-list.

10. The computer-implemented method according to claim 5, further comprising notifying a second contributor that the selected item for purchase was previously purchased by a first contributor without removing the purchased item from the wish-list.

11. The method of providing the settings for the second account for a prospective Internet user according to claim 1, wherein a user associated with the second account makes selections for the wish-list consistent with the settings of the second account.

12. The method of providing the settings for the second account for a prospective Internet user according to claim 11, wherein the user selects a plus (+) symbol from a dashboard screen, and selects an item available for purchase from one of the plurality of service requesters websites.

13. The method of providing the settings for the second account for a prospective Internet user according to claim 1, wherein account information for the first and second accounts is stored in a secure database.

14. A system for allowing the purchase of goods and services, providing control preferences for a prospective Internet user having a non-transitory computer readable medium including a program and a computer executable program code, comprising:
  a plurality of server computers;
  a database hosted on at least one of the server computers, the database storing information for a first account which is a custodian account, and a second account, which includes a user's wish-list;
  the second account including control settings established through the first account, such that purchases made from the wish-list of the second account are consistent with the control settings, the control settings including a list of service requesters authorized by the first account; and
  the wish-list including items that may be purchased from a service requester who has been authorized by the first account,
  wherein the control settings of the second account do not allow item selection from the service requester's website when the service requester's website is not authorized, but item selection may be later authorized by a custodian of the first account.

15. The system providing control preferences for a prospective Internet user according to claim 14, wherein account information for the first and second accounts is stored in a secure database.

16. The system providing control preferences for a prospective Internet user according to claim 14, wherein one or more contributors is authorized to access the wish-list of the second account.

17. The system providing control preferences for a prospective Internet user according to claim 16, wherein the authorized contributors are sent an invitation with an authentication code and a link to a sign-up screen.

18. The system providing control preferences for a prospective Internet user according to claim 17, wherein the sent invitation includes one of an email and SMS.

19. The system providing control preferences for a prospective Internet user according to claim 14, wherein the user selects a plus (+) symbol from a dashboard screen, and selects an item available for purchase from the service requester's website to add it into the user's wish-list.

20. A non-transitory computer-readable storage medium, storing one or more programs configured for execution, the one or more programs for monitoring, transmitting, and recording usage of a computer or mobile device connected to a network, the one or more programs comprising instructions to:
  establish a first account with settings of the first account being stored in a database;
  establish a second account with settings of the second account being stored in the database, wherein the second account includes a wish-list;
  link the first and second accounts such that the settings of the second account are determined through the first account;
  select wish-list items from a plurality of service requesters who have been authorized by a user of the first account; and
  make a purchase from the wish-list of the second account consistent with the control settings of the second account,
  wherein the control settings of the second account do not allow item selection from a service requester's website when the service requester's website is not authorized, but item selection may be later authorized by a custodian of the first account.

21. A method of accessing an online account of an Internet user, the method comprising:
  receiving, at a server computer, via a website providing an application programming interface (API) within an Internet application running on a client computer, a username and password associated with a secondary account at the server computer;
  accessing, based on verification of the username and password by the server computer, the secondary account, the secondary account comprising a wish-list, the wish-list comprising items from a plurality of service requesters who have been authorized by a user of a primary account, the verification including verifying that the website corresponds to a service requester who has been authorized by the user of the primary account; and
  adding at least one item from the website to the wish-list, wherein settings of the primary account are stored in a database in the server computer, wherein the first and second accounts are linked such that the settings of the secondary account are determined through the primary account, wherein, upon selection of the at least one wish-list item for purchase, settings of the primary account are sent to the website to complete the purchase, and wherein the control settings of the second account do not allow item selection from a service requester's website when the service requester's website is not authorized, but item selection may be later authorized by a custodian of the first account.

\* \* \* \* \*